(12) United States Patent
Okamiya et al.

(10) Patent No.: US 7,160,622 B2
(45) Date of Patent: Jan. 9, 2007

(54) OIL REPELLING AGENT

(75) Inventors: Akio Okamiya, Miyota-Machi (JP); Takahiko Ito, Kasugai (JP)

(73) Assignee: Minebea Co., Ltd. (JP)

( * ) Notice: Subject to any disclaimer, the term of this patent is extended or adjusted under 35 U.S.C. 154(b) by 0 days.

(21) Appl. No.: 10/656,648

(22) Filed: Sep. 4, 2003

(65) Prior Publication Data

US 2004/0132881 A1    Jul. 8, 2004

(30) Foreign Application Priority Data

Jan. 7, 2003    (JP) ............................. 2003-001605

(51) Int. Cl.
*B32B 27/20* (2006.01)
*C08K 5/1545* (2006.01)
*C08L 27/12* (2006.01)

(52) U.S. Cl. ...................... 428/421; 384/110; 384/114; 384/908; 384/909; 524/110; 524/544

(58) Field of Classification Search ............... 252/8.62; 524/110, 544, 545, 546; 523/137; 384/100, 384/114, 908, 909; 428/421, 422
See application file for complete search history.

(56) References Cited

U.S. PATENT DOCUMENTS

| | | | |
|---|---|---|---|
| 4,115,283 A | 9/1978 | Needham | 508/107 |
| 4,196,013 A | 4/1980 | Dannenberg et al. | 106/284.05 |
| 4,354,686 A | 10/1982 | Imanishi et al. | 277/431 |
| 4,426,118 A | 1/1984 | Mohsin | 384/12 |
| 4,466,932 A | 8/1984 | Koyama et al. | 264/29.3 |
| 4,699,573 A | 10/1987 | Petrie et al. | 417/370 |
| 4,702,041 A | 10/1987 | Alder | 451/5 |
| 4,704,712 A | 11/1987 | Siryj | 720/676 |
| 4,749,283 A | 6/1988 | Yokomatsu et al. | 384/12 |
| 4,960,827 A | 10/1990 | Miyazaki et al. | 525/131 |
| 5,026,762 A | 6/1991 | Kida et al. | 524/495 |
| 5,236,784 A | 8/1993 | Kobayashi et al. | 428/408 |
| 5,281,032 A | 1/1994 | Slocum | 384/118 |
| 5,346,737 A | 9/1994 | Takahashi et al. | 428/36.9 |
| 5,357,163 A | 10/1994 | Minakuchi et al. | 310/90 |
| 5,360,633 A | 11/1994 | Dean | 427/220 |
| 5,407,280 A | 4/1995 | Heinzl et al. | 384/12 |
| 5,432,213 A | 7/1995 | Kim et al. | 524/41 |
| 5,549,394 A | 8/1996 | Nowak et al. | 384/282 |
| 5,562,396 A | 10/1996 | Yamazaki et al. | 414/676 |
| 5,591,279 A | 1/1997 | Midorikawa et al. | 152/209.4 |
| 5,641,275 A | 6/1997 | Klein et al. | 417/420 |
| 5,692,838 A | 12/1997 | Yoshimoto et al. | 384/12 |
| 5,697,709 A | 12/1997 | Mori et al. | 384/297 |
| 5,730,916 A | 3/1998 | Kunzel et al. | 264/29.4 |
| 5,762,699 A | 6/1998 | McGovern | 106/279 |
| 5,879,791 A | 3/1999 | Kato et al. | 428/295.1 |
| 5,916,499 A | 6/1999 | Murayama et al. | 264/29.1 |

(Continued)

FOREIGN PATENT DOCUMENTS

CN    1301892 A    7/2001

(Continued)

*Primary Examiner*—Ramsey Zacharia
(74) *Attorney, Agent, or Firm*—Ostrolenk, Faber, Gerb & Soffen, LLP (57) ABSTRACT

An oil repelling agent to coat a dynamic pressure device, such as a fluid dynamic pressure bearing device, includes a UV coloring agent, a fluorine-based polymer and a solvent. In an exemplary embodiment of the invention, the concentration of the UV coloring agent component is about 100 PPM to about 400 PPM, and the concentration of the fluorine polymer is about 0.1% by weight to about 0.6% by weight.

20 Claims, 4 Drawing Sheets

U.S. PATENT DOCUMENTS

| | | | |
|---|---|---|---|
| 5,971,614 A | 10/1999 | Kane et al. .................... | 384/12 |
| 6,033,118 A | 3/2000 | Asai et al. ................... | 384/115 |
| 6,095,770 A | 8/2000 | Obata et al. ................ | 417/420 |
| 6,109,887 A | 8/2000 | Takura et al. ............... | 417/348 |
| 6,193,793 B1 | 2/2001 | Long et al. ............ | 106/284.05 |
| 6,196,722 B1 | 3/2001 | Asada ........................ | 384/107 |
| 6,211,592 B1 | 4/2001 | Ichiyama ..................... | 310/90 |
| 6,342,088 B1 | 1/2002 | Klatt et al. ................... | 75/300 |
| 6,395,677 B1 | 5/2002 | Hokkirigawa et al. ...... | 502/402 |
| 6,404,087 B1 | 6/2002 | Ichiyama ..................... | 310/90 |
| 6,448,307 B1 | 9/2002 | Medoff et al. .............. | 523/129 |
| 6,456,458 B1 | 9/2002 | Ichiyama ................. | 360/99.08 |
| 6,472,042 B1 | 10/2002 | Dibbern et al. ................ | 428/95 |
| 6,494,928 B1 | 12/2002 | Hokkirigawa et al. ........ | 51/303 |
| 6,513,979 B1 | 2/2003 | Mori et al. ................. | 384/107 |
| 6,550,508 B1 | 4/2003 | Yamaguchi et al. ........ | 152/167 |
| 6,573,215 B1 | 6/2003 | Hokkirigawa et al. ...... | 502/402 |
| 6,582,130 B1 * | 6/2003 | Yokouchi et al. ........... | 384/492 |
| 6,685,356 B1 | 2/2004 | Hirata ........................ | 384/100 |
| 6,777,360 B1 | 8/2004 | Hokkirigawa et al. ........ | 501/87 |
| 2002/0050766 A1 | 5/2002 | Mori et al. | |
| 2002/0054717 A1 | 5/2002 | Zywno ........................ | 384/12 |
| 2002/0152694 A1 | 10/2002 | Hokkirigawa et al. ....... | 52/79.9 |
| 2002/0152697 A1 | 10/2002 | Hokkirigawa et al. ..... | 52/173.1 |
| 2002/0158529 A1 | 10/2002 | Liu et al. ................... | 310/90.5 |
| 2002/0173431 A1 | 11/2002 | Hirata et al. | |
| 2002/0174605 A1 | 11/2002 | Hokkirigawa et al. ........ | 51/303 |
| 2002/0174771 A1 | 11/2002 | Hokkirigawa et al. ......... | 96/108 |
| 2002/0175118 A1 | 11/2002 | Hokkirigawa et al. ...... | 210/266 |
| 2002/0192469 A1 | 12/2002 | Hokkirigawa et al. ...... | 428/402 |
| 2003/0048577 A1 | 3/2003 | Kayama et al. .......... | 360/99.08 |
| 2003/0134104 A1 | 7/2003 | Hokkirigawa et al. ... | 428/317.9 |
| 2003/0183973 A1 | 10/2003 | Hokkirigawa et al. ...... | 264/109 |
| 2003/0220421 A1 | 11/2003 | Hokkirigawa et al. ......... | 524/9 |
| 2003/0229161 A1 | 12/2003 | Hokkirigawa et al. ........ | 524/15 |
| 2004/0013333 A1 | 1/2004 | Hokkirigawa et al. ...... | 384/297 |
| 2004/0165797 A1 | 8/2004 | Oku et al. .................. | 384/119 |

FOREIGN PATENT DOCUMENTS

| | | |
|---|---|---|
| DE | 2345460 | 3/1975 |
| DE | 3627771 | 6/1987 |
| EP | 182703 | 5/1986 |
| EP | 1 344 791 A1 | 9/2003 |
| JP | 5032797 A | 2/1993 |
| JP | 10095647 A | 4/1998 |
| JP | 10219031 | 8/1998 |
| JP | 11021407 A | 1/1999 |
| JP | 2000-266052 | 9/2000 |
| JP | 2001-27242 | 1/2001 |
| JP | 2001-89273 A | 4/2001 |
| JP | 2001-304263 | 10/2001 |
| JP | 2002284553 A | 10/2002 |
| SU | 1835412 A1 | 8/1993 |

* cited by examiner

OIL REPELLING AGENT

FIELD OF THE INVENTION

The present invention relates to oil repelling agents, and more particularly to oil repelling agents that are used to form oil repelling films on, for example, a dynamic pressure device, such as a fluid dynamic pressure bearing device, that is loaded on a spindle motor of a hard disk drive.

BACKGROUND OF THE INVENTION

In recent years, hard disk drives (commonly referred to as "HDD") have been incorporated into household appliances such as personal video recorders (commonly referred to as "PVR's"). A hard disk drive in a typical PVR has enough memory capacity for several hundred hours of digital recording. Such high memory capacity is due to very high memory density, which has become possible by advancements in manufacturing. Due to the high density of memory cells, complex data reading and data writing techniques are required for the proper handling of data obtained from and written onto a hard disk drive in, for example, a PVR. The quality of the hard disk drive directly effects whether such complex data reading and data writing techniques may be practiced properly. This in turn affects the reliability of, and the noise generated from, the hard disk drive. The reliability of, and the noise generated from, the hard disk drive are factors that make modern PVRs attractive to consumers.

A typical hard disk drive includes a spindle motor. The spindle motor includes, for example, a fluid dynamic pressure bearing device. The fluid dynamic pressure bearing device includes a shaft, a sleeve that receives the shaft, and a layer of dynamic pressure fluid such as oil that resides between the shaft and the sleeve.

To attain optimum performance of the fluid dynamic pressure device, the fluid dynamic pressure of the dynamic pressure fluid should be maximized. In order to maximize the fluid dynamic pressure of the dynamic pressure fluid in the fluid dynamic pressure bearing device, it is necessary to prevent wet diffusion of the dynamic pressure fluid.

Wet diffusion may occur due to:

(A) the capillary action of the dynamic pressure fluid between the outer surface of the shaft and the inner surface of the sleeve;

(B) the scattering of the dynamic pressure fluid when, for example, the bearing device is started, stopped, accelerated, or subjected to an impact; and/or (C) the possible overflow of the dynamic pressure fluid when the temperature of the bearing device has risen.

To prevent wet diffusion, it is known to form an oil repelling film on certain portions of the pressure bearing device and/or the hard disk drive. To form the oil repelling film, an oil repelling agent is first applied to a desired area and baked to form an oil repelling film.

To ensure the quality of the oil repelling film, the quality of the coating of the oil repelling agent and/or the quality of the oil repelling film itself must be inspected. One known inspection method is visual inspection.

A known oil repelling agent is a colorless and transparent resin of the fluorine system. An oil repelling film formed from such a resin is difficult to inspect by the naked eye. As a result, it is difficult to control the quality of the oil repelling film on a dynamic pressure bearing device, such as a fluid dynamic pressure bearing device. In the absence of visual inspection, the reliability of a spindle motor having an oil repelling film formed from such an oil repelling agent may be compromised due to wet diffusion.

The Official Publication of Toku Kai 2001-27242 proposed a solution to improve the visual examination of the quality of the coating of the oil repelling agent and the quality of the oil repelling film formed from the oil repelling agent. The solution called for using a coloring agent to facilitate visual examination.

Although the solution proposed by the publication may improve the visual examination of the quality of the oil repelling film, it has been found that the coloring agent in the proposed oil repelling agent generates a quantity of outgas that is markedly larger in volume than the outgas generated from other conventional oil repelling films. Outgas, for example, is generated by heat during operation of a hard disk drive, and by evaporation. This increase in the quantity of the outgas adversely effects the reliability of the hard disk drive. Also, the outgas may reduce the useful area of the magnetic disk and the density of the memory surface of the magnetic head. It is, therefore, desirable to produce a dynamic pressure device, such as a fluid dynamic pressure bearing device, with a reduced amount of generated outgas.

It is also desirable to produce such a dynamic pressure device without adding significant steps to conventional production processes, which are adapted for mass production.

SUMMARY OF THE INVENTION

According to one aspect of the present invention, an oil repelling film is produced from an oil repelling agent which generates a reduced amount of outgas.

Another aspect of the present invention is a dynamic pressure device, such as a fluid dynamic pressure bearing device, having an oil repelling film that prevents wet diffusion.

Another aspect of the present invention is a method for manufacturing a dynamic pressure device, such as a fluid dynamic pressure bearing device, which can be mass produced.

Another aspect of the present invention is a method for producing a dynamic pressure device, such as a fluid dynamic pressure bearing device, which allows for easy visual inspection of the quality of the coat of the oil repelling agent.

Another aspect of the present invention is a method for producing a dynamic pressure device, such as a fluid dynamic pressure bearing device, that does not generate a significant amount of outgas.

To achieve the aspects set forth above, a sleeve and a shaft of a fluid dynamic pressure bearing device, for example, are coated with an oil repelling agent that includes a UV coloring agent, a fluorine-based polymer and a solvent. The sleeve and the shaft are then dried at room temperature, for example, and the coating is subsequently baked at a temperature between about 90° C. to about 150° C. to form an oil repelling film. As a result, the sleeve and the shaft may be visually inspected by any of the known methods such as by the naked eye of an operator under ultraviolet ("UV") light. Alternatively, the operator may conduct the visual inspection with the aid of a magnifying glass or microscope, or by scanning the desired area with a CCD camera under UV light and viewing the scanned area on a monitor. If desired, the CCD camera allows the scanned area to be automatically inspected electronically, which eliminates the need for a human operator. This can be accomplished by any of the known methods. A fluid dynamic pressure bearing device including a sleeve and shaft formed according to the present invention may be incorporated, for example, in a hard disk drive as a spindle.

According to an exemplary embodiment of the present invention, the concentration of the UV coloring agent should be about 100 PPM to about 400 PPM.

According to another an exemplary embodiment of the present invention, the concentration of the fluorine-based polymer should be about 0.1% by weight to about 0.6% by weight.

According to another an exemplary embodiment of the present invention, the concentration of the UV coloring agent should be about 150 to about 300 PPM, and the density of the fluorine-based polymer should be about 0.2% by weight to about 0.5% by weight.

Other features and advantages of the present invention will become apparent from the following description of the invention, which refers to the accompanying drawings.

DESCRIPTION OF EMBODIMENTS OF THE INVENTION

Figure 1:
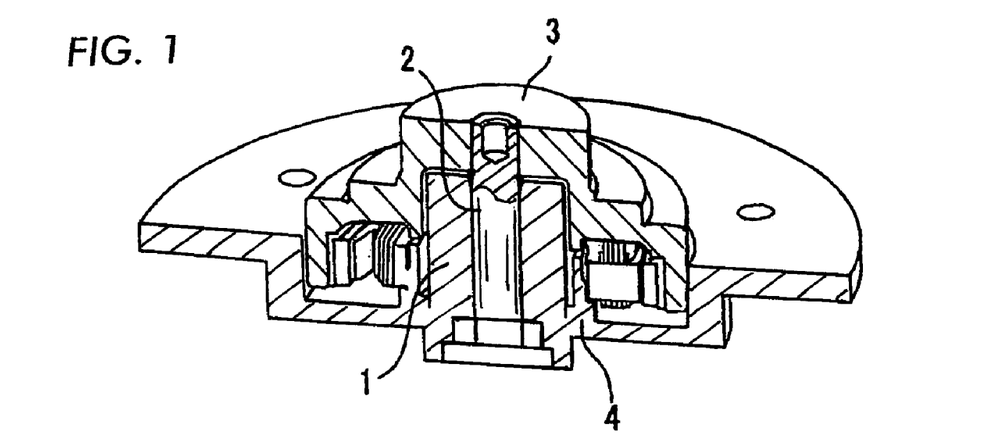
FIG. 1 is a perspective view of a cross-section of a portion of a spindle motor for a hard disk drive that carries an exemplary fluid dynamic pressure bearing device according to the present invention.
Figure 2:
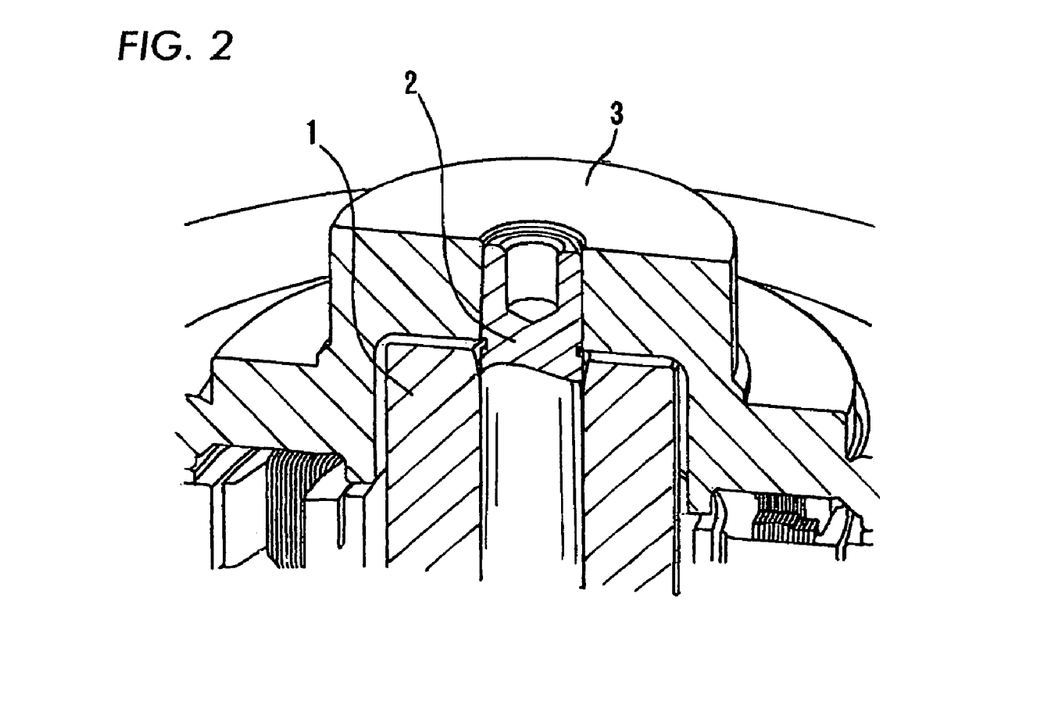
FIG. 2 is an enlarged perspective view of a cross-section of a portion of an exemplary spindle motor for a hard disk drive according to the present invention.

FIGS. 1 and 2 show a cross-section of a portion of an exemplary spindle motor for a hard disk drive carried by an exemplary fluid dynamic pressure bearing device. The spindle motor includes a hub 3, a shaft 2, a sleeve 1 and a flange (base plate) 4. Hub 3 rotates by supporting a magnetic disk and is held on shaft 2. The outer surface of sleeve 1 is supported by the inner diameter of flange 4.

Figure 3:
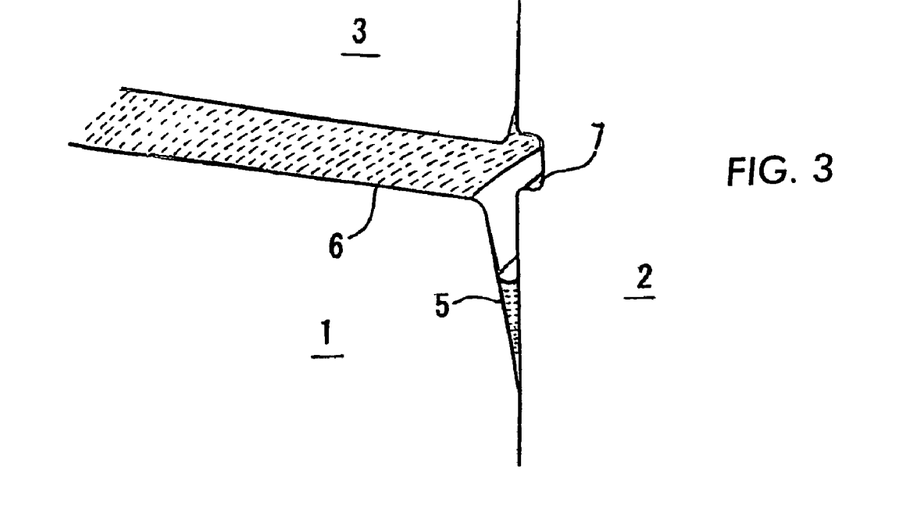
FIG. 3 is an enlarged perspective view of a cross-section of a portion of an exemplary spindle motor for a hard disk drive according to the present invention.

FIG. 3 is a cross-sectional view of the fluid dynamic pressure bearing device of FIG. 1. FIG. 3 shows dynamic pressure oil 5 deposited between the inner diameter of sleeve 1 and the outer diameter of shaft 2. Dynamic pressure oil 5 can be any of the known dynamic pressure oils.

FIG. 3 also shows an example of where the oil repelling film of the present invention is formed on a fluid dynamic pressure bearing device. According to an exemplary embodiment of the present invention, the oil repelling film of the present invention is formed on the atmospheric side of the fluid dynamic pressure bearing device. For example, the oil repelling film is formed on the boundary surface between the fluid dynamic pressure oil 5 deposited between the inner diameter of sleeve 1 and the outer diameter of shaft 2, and the atmosphere. See FIGS. 3 and 4. These surfaces are, for example, a terminal or end face 6 of sleeve 1 and an outer diameter part 7 of shaft 2. It should be realized by those skilled in the art, however, that the present invention does not require that only the parts discussed herein be covered with an oil repelling film. Any desired part or surface of a bearing device or the like can be covered with an oil repelling film and/or agent.

Figure 4:
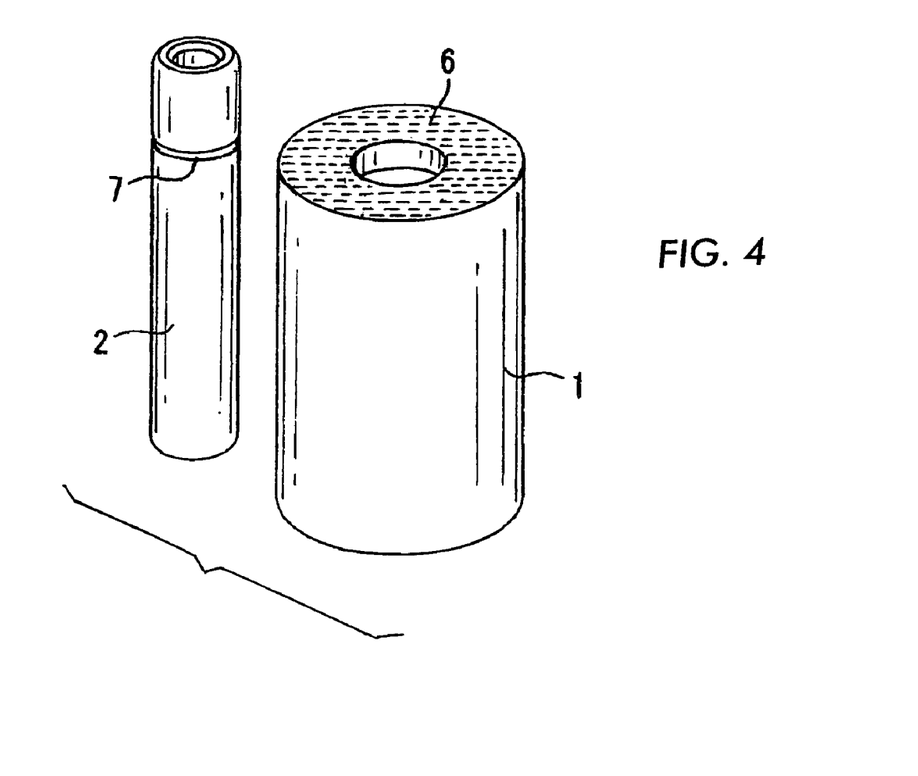
FIG. 4 is a schematic showing a sleeve and a shaft of an exemplary fluid dynamic pressure bearing device according to the present invention.

Referring now to FIG. 4, according to an exemplary embodiment of the present invention, after receiving the oil repelling film, bearing components sleeve 1 and shaft 2 are assembled by any of the known methods, to form a fluid dynamic pressure bearing device. For example, after forming the oil repelling film on sleeve 1 and shaft 2, dynamic pressure oil 5 is then deposited, e.g., filled, between the inner diameter of sleeve 1 and the outer diameter of shaft 2 at room temperature. Dynamic pressure oil 5 may be deposited at any desirable time during the manufacture of the fluid dynamic pressure bearing device by any of the known methods. For example, dynamic pressure oil 5 may be filled after the assembly of the fluid dynamic pressure bearing device or prior to the incorporation of hub 3.

The oil repelling agent, according to an exemplary embodiment of the present invention, is made of a UV coloring agent, a fluorine-based polymer and a solvent. PFPE (perfluoropoly ether) and HFC (hydrofluorocarbon) are examples of suitable solvents for the present invention. In an exemplary embodiment of the invention, the concentration of the UV coloring agent should be about 100 PPM to about 400 PPM, and the concentration of the fluorine-based polymer should be about 0.1% by weight to about 0.6% by weight.

According to an exemplary embodiment of the present invention, the oil repelling film is formed by coating the surface of a desired area such as the selected surface of sleeve 1 and shaft 2 described above with the oil-repelling agent, followed by drying and baking the same. Any suitable coating method may be employed taking into consideration the size and shape of the surface and parts to be coated. For example, brush painting, spray coating, dip coating, spin coating, transfer coating and potting coating, and the like are suitable coating methods.

After terminal face 6 of sleeve 1 and outer diameter part 7 of shaft 2 are coated with the oil repelling agent, sleeve 1 and shaft 2 are placed under UV light and visually examined to determine the quality of the coat of the oil repelling agent. Sleeve 1 and/or shaft 2 can be easily examined by the naked eye, or can be examined by any of the known methods as discussed above, as needed. When UV light, for example, is applied, a visible ray of either purple or blue light is generated, thereby, making it possible to visually examine the quality of the coat of the oil repelling agent. For example, sleeve 1 and shaft 2 are visually examined to determine if the oil repelling agent fully covers the desired application area.

According to an exemplary embodiment of the present invention, after the desired surface is coated with the oil repelling agent, such as bearing components sleeve 1 and/or shaft 2, the oil repelling film is formed by baking or heating the oil repelling agent for a period of one hour at a temperature in the range between about 90° C. to 150° C. Preferably, after coating the article with the oil repelling agent, the coat is allowed to air dry prior to baking the article. After baking, it has been found that an oil repelling film is formed and fixed on the article with strong adhesion.

In an exemplary embodiment of the invention, the thickness of the film should be about 0.1 to about 2 microns. In an exemplary embodiment of the invention, the thickness of the film depends on the concentration of the fluorine-based polymer. If the concentration of the polymer is at the high end of the 0.1% to 0.6% range, then the thickness of the film will be at the high end of the 0.1 to 2.0 micron range. Similarly, if the concentration of the polymer is at the low end of the 0.1% to 0.6% range, then the thickness of the film will be at the low end of the 0.1 to 2.0 micron range. For example, if the concentration of the polymer is about 0.5%, then the film thickness should be about 2.0 microns. If the concentration of the polymer is about 0.2%, then the thickness of the film should be about 0.1 to about 0.2 microns.

In an exemplary embodiment of the present invention, the oil repelling agent of the present invention can be used in any of the known or conventional processes for forming oil repelling films on a desired article. For example, the baking temperature or the baking time used in known processes for forming oil repellant films does not need to be changed. Therefore, oil repelling films can be formed with the oil repelling agents of the present invention in the same manufacturing facilities that form known oil repelling films.

It has been found that the quantity of outgas is markedly reduced when an oil repelling agent of the present invention is used. Not being bound by theory, it is believed that when an oil repelling agent of the present invention is used, the UV coloring agent during the baking process is both evaporated and diffused into the fluorine-based polymer. As a result, the residual concentration of both the coloring agent and the fluorine based polymer is reduced, thereby, reducing the amount of the outgas generated from the oil repelling film. It has also been found that by forming an oil repelling film of the present invention on, for example, the surface of hub 3 opposite the terminal face part 6 of sleeve 1, wet diffusion due to scattering and the like may also be prevented.

In an exemplary embodiment of the present invention, the UV coloring agent is derived from the coumarin system, although it should be realized by those skilled in the art that any coloring agent can be used as long as it is consistent with the aspects or purpose(s) of the present invention. In an exemplary embodiment of the present invention, at least one of organic pigments formed from compounds from the coumarin system, the anthraquinone system, the quinacridone system, the phthalo cyanine system and the azelaic system, and the like may be used in the oil repelling agent. In an exemplary embodiment of the present invention, at least one of compounds of the anthraquinone system and the azo system, and the like may be used as dyes.

In an exemplary embodiment of the present invention, the concentration of the UV coloring agent component of the oil repelling agent should be in the range from about 100 PPM to about 400 PPM, preferably from about 150 PPM to about 300 PPM.

It has been found that when the oil repelling agent includes less than about 100 PPM of the UV coloring agent, coloration can not be observed by visual inspection after drying at room temperature. This makes it difficult to examine the quality of the coat of the oil repelling agent.

When the oil repelling agent includes more than about 400 PPM of the UV coloring agent, it has been found that coloration can be observed in the oil repelling film, thereby, revealing that there is a residue of UV coloring agent in the oil repelling film. It has been found, however, that the quantity of outgas in such an oil repelling film is markedly larger than an oil repelling film formed from an oil repelling agent containing less than 400 PPM of the UV coloring agent, and in particular less than about 300 PPM of the UV coloring agent.

In an exemplary embodiment of the present invention, the oil repelling agent may include any suitable flourine-based polymer or the like. Non-limiting examples include at least one of the following fluorine-based resins: ethylene-tetrafluoro ethylene copolymer (ETFE), polyvinyl fluoride (PVF), polyvinylidene fluoride (PVDF), ethylene-chloro trifluoro ethylene copolymer (ECTFE), polychloro trifluoro ethylene (PCTFE), tetrafluoro ethylene perfluoro alkyl vinyl ether copolymer (PFA), polytetrafluoro ethylene (PTFE), tetrafluoroethylene-hexaflyoiropropylene copolymer (FED), and the like. In an exemplary embodiment of the present invention, a resin from the perfluoro resin system, either crystalline or non-crystalline or the like, having a lower surface energy may be also used.

In an exemplary embodiment of the present invention, the concentration of the fluorine-based polymer in the oil repelling agent should be in the range between about 0.1% to about 0.6%, by weight, preferably in the range between about 0.2% to about 0.5% by weight. It has been found that when the fluorine-based polymer concentration is higher than about 0.6% by weight, the concentration of the UV coloring agent component that remains in the oil repelling film formed after baking is high. As a result, the quantity of the generated outgas is approximately the same as that of an oil repelling film formed from a conventional oil repelling agent.

Without being bound by theory, it is believed that the fluorine-based polymer is responsible for the wet diffusion preventative characteristics of the oil repelling film of the present invention. It has been found that an oil repelling agent having less than about 0.1% by weight of the fluorine-based polymer, cannot form an oil repelling film capable of sufficiently preventing wet diffusion.

It has been found that when the concentration of the fluorine-based polymer is more than about 0.2% by weight, but less than about 0.5% by weight, more desirable wet diffusion characteristics are exhibited by the oil repelling film of the present invention. It has also been found that the quantity of the generated outgas can be reduced to less than that of an oil repelling film formed from an oil repelling agent that does not contain a coloring agent component.

EXAMPLES

To make test pieces, one-inch square Stainless Steel pieces such as SUS 304 pieces were cleansed in a cleaning solution (a mixed solution of isopropanol and hexane) and dried at 100° C. for a period of one hour.

Three examples of oil repelling agents were then prepared based on a solution having a fluorine-based polymer concentration of 0.5% by weight. The oil repelling agent examples included a UV coloring agent from the coumarin system, a perfluoralkylradical polymer as a fluorine-based resin and 2,3 dihydroperfluoropentane as a solvent. The amount of the UV coloring agent for Example 1 was set at 200 PPM, 300 PPM for Example 2, and 400 PPM for Example 3.

A conventional oil repelling agent containing a coloring agent component was used as Comparative Example 1. A colorless (no coloring agent) oil repelling agent was used as Comparative Example 2.

Test samples were prepared and tested in the following manner: an entire side of each test piece was coated with one of the respective oil repelling examples described above and dried at room temperature. The Example 1 oil repelling agent was used to form test Example 1. The Example 2 oil repelling agent was used to form test Example 2. The Example 3 oil repelling agent was used to form test Example 3. The Comparative Example 1 oil repelling agent was used to form test Comparative Example 1. The Comparative Example 2 oil repelling agent was used to form test Comparative Example 2.

The quality of the coat of the oil repelling agent was determined for Examples 1–3 and Comparative Example 1. In particular, the degree of coloration and visual detectability of each of the test pieces was measuring by applying a UV light to the coated side of each test piece. The test pieces were then visually inspected under a microscope, which allowed for a more detailed examination of the finer portions of the test pieces.

Comparative Example 2 was difficult to examine. It is believed that the reason for this, without being bound by theory, is that any coloring substance contained in the solvent was adsorbed by the coated surface of the test piece rendering the coated surface essentially colorless. The quality of the coat of the oil repelling agent was visually inspected in the same manner as for Examples 1–3 and Comparative Example 1.

Examples 1–3 exhibited a high degree of coloration and visual detectability. This shows that in actual production, components bearing the oil repelling agent of the present invention can be easily visually inspected by the naked eye.

After the visual inspection, Example 1, Example 2, Example 3, Comparative Example 1 and Comparative Example 2 were heated for one hour at 100° C., thereby, baking the oil repelling agent to form an oil repelling film on each test piece. The colored test pieces were then subjected to UV light and examined under a microscope to determine the degree of coloration and visual detectability in each test piece.

No coloration was recognized in the test pieces of Example 1 and Example 2. This seems to confirm that the concentration of the UV coloring agent component in the oil repelling film may have been reduced. In Example 3, some coloration was observed. In Comparative Example 1, coloration similar to the coloration prior to baking was observed. It was difficult to carry out a visual examination of the test piece coated with Comparative Example 2 for the above reasons.

Amount of Out Gas Generated Prior to Baking

The amount of the outgas generated by each test sample prior to baking was measured in the following manner: after the visual inspection, an amount of oil repelling coating (dried oil repelling agent prior to baking) was collected from Example 1, Example 2, Example 3, Comparative Example 1 and Comparative Example 2. For a period of three hours at 105° C., the outgas (Helium as standard) was collected at a rate of 50 milliliters per minute. As a result, the total outgas volume (ng) generated per unit weight (1 mg) of the oil repelling coating and the amount of the outgas generated for the fluorine polymer (both in nanograms, ngs) were obtained.

In testing for the quantity of outgas generated from the oil repelling agent of Comparative Example 2, a test piece was used that had not been visually inspected. In other words, the solvent used in the oil repelling agent contained no coloring agent to be adsorbed by the coated surface.

Figure 5:
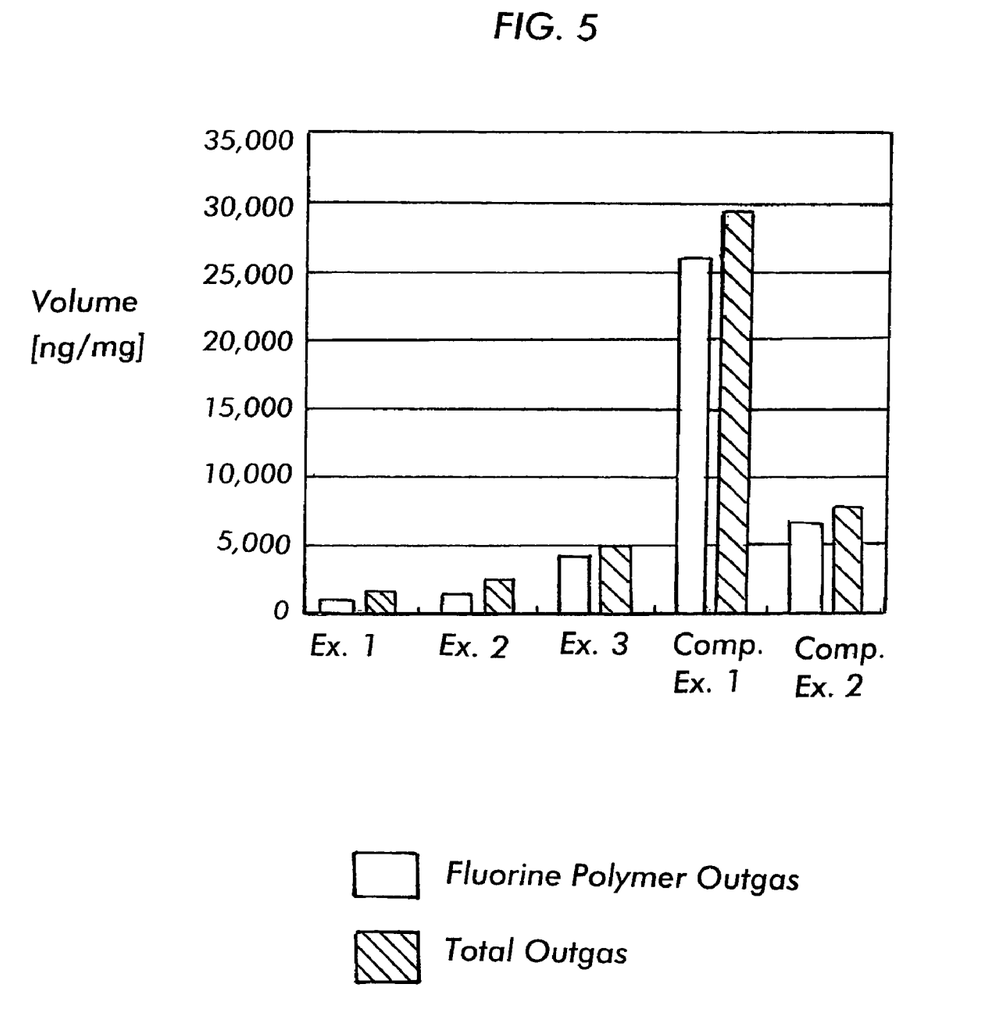
FIG. 5 shows a graph of generated outgas from oil repelling agents of the present invention and commercially available agents prior to baking the oil repelling agent.

The total outgas values and the values for fluorine-based polymer outgass prior to baking for the oil repelling agents of Example 1, Example 2, Example 3, Comparative Example 1 and Comparative Example 2, are shown in FIG. 5, and detailed in Table 1.

TABLE 1

| | | Prior to Baking | |
|---|---|---|---|
| | Coloring Agent | Fluorine Polymer Outgas (ng/mg) | Total Outgas (ng/mg) |
| Example 1 | 200 PPM | 1,054 | 1,648 |
| Example 2 | 300 PPM | 1,482 | 2,555 |
| Example 3 | 400 PPM | 4,195 | 4,771 |
| Comparative Example 1 | Conventional, with a coloring agent | 26,125 | 29,357 |
| Comparative Example 2 | Conventional, no coloring agent | 6,738 | 7,956 |

Amount of Out Gas Generated After Baking

Each of the test pieces of Example 1, Example 2, Example 3, Comparative Example 1 and Comparative Example 2 was heated for about one hour at 100° C. to form an oil repelling film. The oil repelling film was then collected from each of the test pieces as described above. For a period of three hours at 105° C., the outgas was collected (Helium as standard) from the oil repelling film of each test piece at a rate of 50 milliliters per minute. As a result, the total volume of the outgas generated per unit weight of the oil repelling film and the amount of outgas of the fluorine polymer were obtained.

In testing for the quantity of outgas from the oil repelling agent according to Comparative Example 2, a test piece was used that had not been visually inspected, i.e., coated with an oil repelling agent having a solvent that was not adsorbed onto the coated surface. The test piece was heated to 100° C. for one hour, thereby, baking the oil repelling agent to form an oil repelling film. The test piece was then measured as set forth above with respect to the other four test pieces.

Figure 6:
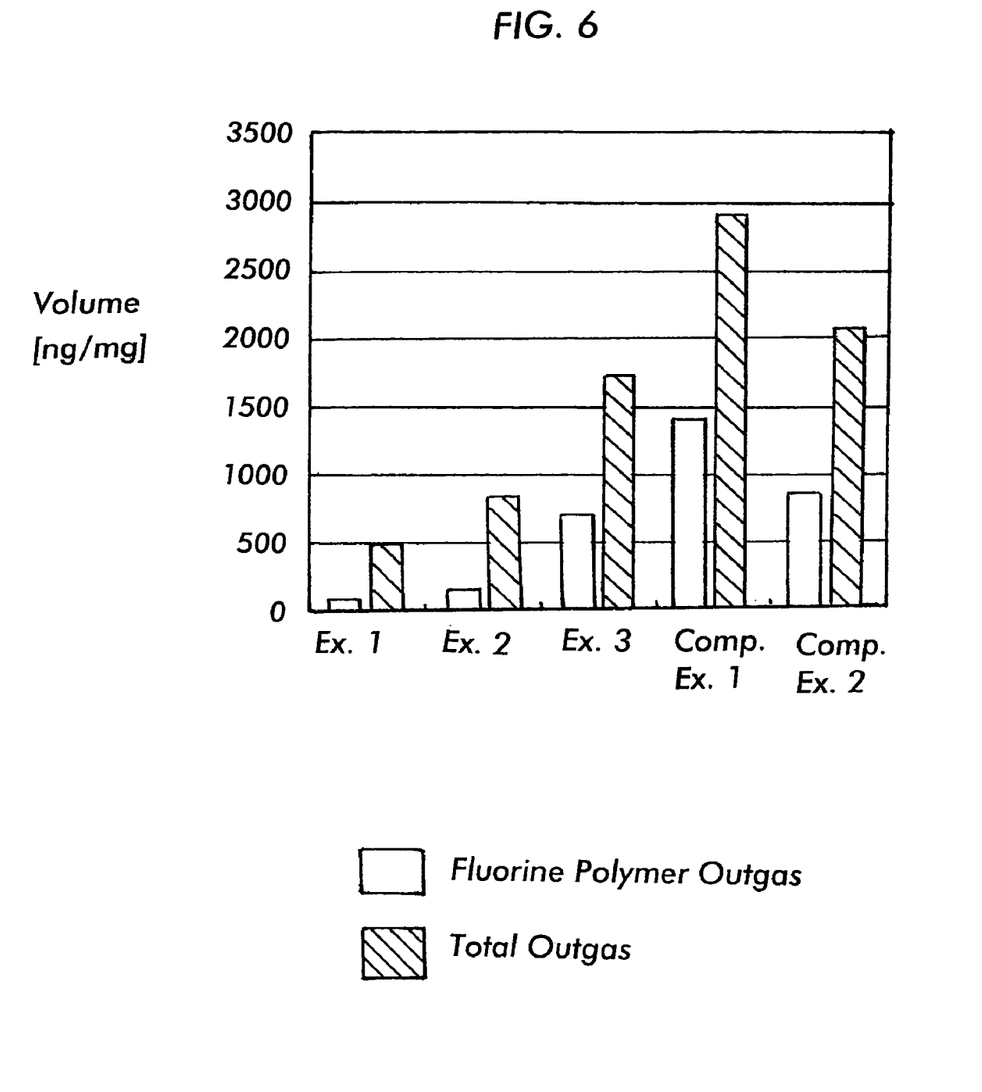
FIG. 6 shows a graph of generated outgas from oil repelling films formed from baking oil repelling agents of the present invention and commercially available agents.

The total outgas values and the values for the fluorine-based polymer outgas, after baking, for the oil repelling agents of Example 1, Example 2, Example 3, Comparative Example 1 and Comparative Example 2, are shown in FIG. 6, and detailed in Table 2.

TABLE 2

| | | After Baking | |
|---|---|---|---|
| | Coloring Agent | Fluorine Polymer Outgas (ng/mg) | Total Outgas (ng/mg) |
| Example 1 | 200 PPM | 67 | 466 |
| Example 2 | 300 PPM | 154 | 828 |
| Example 3 | 400 PPM | 685 | 1,734 |
| Comparative Example 1 | Conventional, with a coloring agent | 1,402 | 2,932 |
| Comparative Example 2 | Conventional, no coloring agent | 832 | 2,077 |

As can be seen, the outgas values obtained prior to baking show that the concentration of the coloring agent effects the amount of the flourine polymer outgas. For example, the concentration of the coloring agent can be adjusted to effectively reduce the volume of the fluorine polymer outgas compared with a conventional oil repelling agent that contains a coloring agent (Comparative Example 1). The volume of the flourine polymer outgas can even be reduced to less than the values of outgas from a conventional oil repelling agent that does not contain a coloring agent (Comparative Example 2).

The outgas values obtained after baking show similar results for oil repelling agents having UV coloring agents in the amount of 200 PPM (Example 1) and 300 PPM (Example 2) and 400 PPM (Example 3).

It should be noted that the maximum value for the axial scale for the volume of the outgas shown in FIG. 5 (before baking) and FIG. 6 (after baking) were 35,000 ng/mg and 3,500 ng/mg, respectively.

In summary, it has been found that in an oil repelling agent based on a fluorine-based polymer, when the concentration of the UV coloring agent is about 100 PPM to about 400 PPM, and preferably about 150 PPM to about 300 PPM, and the concentration of the fluorine polymer is about 0.1% to about 0.6% by weight, and preferably about 0.2% to about 0.5% by weight, the oil repelling agent is particularly suited for use in the manufacture of parts that require oil repellent films, e.g., fluid dynamic pressure bearing components.

Although the present invention has been described in relation to particular embodiments thereof, many other variations and modifications and other uses will become apparent to those skilled in the art. It is preferred, therefore, that the present invention be limited not by the specific disclosure herein.

What is claimed is:

1. An oil repelling agent, comprising:
   about 100 PPM to about 400 PPM of a UV coloring agent;
   from about 0.1% to about 0.6% by weight of a fluorine-based polymer; and
   a solvent.

2. The oil repelling agent of claim 1, wherein the quantity of the UV coloring agent is about 150 PPM to about 300 PPM.

3. The oil repelling agent of claim 1, wherein the weight percent of the fluorine-based polymer is about 0.2% to about 0.5%.

4. The oil repelling agent of claim 1, wherein the UV coloring agent is a compound from the coumarin system.

5. The oil repelling agent of claim 1, further comprising organic pigments.

6. The oil repelling agent of claim 1, further comprising dyes.

7. An oil repelling agent, comprising:
   about 150 PPM to about 300 PPM of a UV coloring agent;
   about 0.2% to about 0.5% by weight of a fluorine-based polymer; and a solvent.

8. A bearing component, comprising:
   a surface having an oil repelling film deposited thereon, the oil repelling film
   being formed from an oil repelling agent including:
   about 100 PPM to 400 PPM of a UV coloring agent;
   from about 0.1% to about 0.6% by weight of a fluorine-based polymer; and
   a solvent.

9. The bearing component of claim 8, wherein the bearing component is a sleeve of a bearing device.

10. The bearing component of claim 8, wherein the bearing component is a shaft of a bearing device.

11. The bearing component of claim 8, wherein the bearing component is included as part of a bearing device.

12. The bearing component of claim 8, wherein the bearing component is included as part of a hard disc drive.

13. A fluid dynamic pressure bearing component, comprising:
   a surface having an oil repelling film deposited thereon, the oil repelling film
   being formed from an oil repelling agent including:
   about 100 PPM to 400 PPM of a UV coloring agent;
   from about 0.1% to about 0.6% by weight of a fluorine-based polymer; and
   a solvent.

14. The fluid dynamic pressure bearing component of claim 13, wherein the bearing component is a sleeve of a fluid dynamic pressure bearing device.

15. The fluid dynamic pressure bearing component of claim 13, wherein the fluid dynamic pressure bearing component is a shaft of a fluid dynamic pressure bearing device.

16. The fluid dynamic pressure bearing component of claim 13, wherein the fluid dynamic pressure bearing component is included as part of a fluid dynamic pressure bearing device.

17. The fluid dynamic pressure bearing component of claim 13, wherein the fluid dynamic pressure bearing component is included as part of a hard disc drive.

18. A fluid repelling agent, comprising:
   about 100 PPM to about 400 PPM of a UV coloring agent;
   from about 0.1% to about 0.6% by weight of a fluorine-based polymer; and
   a solvent.

19. The fluid repelling agent of claim 18, wherein the quantity of the UV coloring agent is about 150 PPM to about 300 PPM.

20. The fluid repelling agent of claim 18, wherein the weight percent of the fluorine-based polymer is about 0.2% to about 0.5%.

* * * * *